United States Patent
Garcia Morchon et al.

(10) Patent No.: US 8,837,736 B2
(45) Date of Patent: Sep. 16, 2014

(54) METHOD FOR DISTRIBUTING ENCRYPTION MEANS

(75) Inventors: Oscar Garcia Morchon, Eindhoven (NL); Mark Patrick Sillner, Bretzfeld (DE); Bozena Erdmann, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 177 days.

(21) Appl. No.: 12/936,535

(22) PCT Filed: Apr. 10, 2009

(86) PCT No.: PCT/IB2009/051526
§ 371 (c)(1),
(2), (4) Date: Oct. 6, 2010

(87) PCT Pub. No.: WO2009/128010
PCT Pub. Date: Oct. 22, 2009

(65) Prior Publication Data
US 2011/0033054 A1    Feb. 10, 2011

(30) Foreign Application Priority Data
Apr. 14, 2008    (EP) .................................... 08305101

(51) Int. Cl.
*G06F 21/00*    (2013.01)
*H04L 9/08*    (2006.01)
*H04L 29/06*    (2006.01)

(52) U.S. Cl.
CPC ............. *H04L 9/083* (2013.01); *H04L 2209/80* (2013.01); *H04L 63/06* (2013.01)
USPC ....................................................... 380/279

(58) Field of Classification Search
CPC ....................................................... H04L 9/083
USPC ....................................................... 380/279
See application file for complete search history.

(56) References Cited

U.S. PATENT DOCUMENTS
5,802,521 A * 9/1998 Ziauddin et al. ...................... 1/1
(Continued)

FOREIGN PATENT DOCUMENTS
JP    2001156766 A    6/2001
WO    2006035400 A1    4/2006
(Continued)

OTHER PUBLICATIONS

Sanchez, D.S.; Baldus, H., "A Deterministic Pairwise Key Pre-distribution Scheme for Mobile Sensor Networks," First International Conference on Security and Privacy for Emerging Areas in Communications Networks, 2005. SecureComm 2005., vol., no., pp. 277,288, Sep. 5-9, 2005, doi: 10.1109/SECURECOMM.2005.2.*

(Continued)

*Primary Examiner* — Pramila Parthasarathy
*Assistant Examiner* — Dao Ho (57) ABSTRACT

The present invention relates to method for operating a trust center for distributing key material to at least one radio station, comprising the steps of at the trust center, dividing an identifier of the radio station, said identifier being a code word consisting a first number of bits, into a plurality of subidentifiers, and generating for each subidentifier, an keying material function selected out of a set of keying material functions on the basis of the considered subidentifier at the trust center, transmitting to the radio station the identifier and the key material comprising the generated encryption functions.

8 Claims, 5 Drawing Sheets

(56) References Cited

U.S. PATENT DOCUMENTS

| | | | |
|---|---|---|---|
| 7,206,861 B1* | 4/2007 | Callon | 709/242 |
| 2004/0117600 A1* | 6/2004 | Bodas et al. | 712/210 |
| 2005/0220023 A1* | 10/2005 | Kodialam et al. | 370/235 |
| 2007/0101126 A1* | 5/2007 | Choi et al. | 713/156 |
| 2008/0209214 A1 | 8/2008 | Schrijen et al. | |
| 2009/0129599 A1 | 5/2009 | Garcia et al. | |

FOREIGN PATENT DOCUMENTS

| | | | |
|---|---|---|---|
| WO | 2006131849 A2 | 12/2006 | |
| WO | 2007149850 A2 | 12/2007 | |

OTHER PUBLICATIONS

Blundo et al: "Perfectly-Secure Key Distribution for Dynamic Conferences"; Advances in Cryptology, vol. Conf. 12, Aug. 1992, CRPTO '92, LNCS 740, pp. 471-486.

Delgosha et al: "MKPS: A Multivariate Polynomial Scheme for Symmetric Key-Establishment in Distributed Sensor Networks"; IWCMC 2007: Proceedings of the 2007 International Wireless Communications and Mobile Computing Conference, Honolulu, HI, Aug. 2007, ACM: Association for Computing Machinery, pp. 236-241.

Liu et al: "Establishing Pairwise Keys in Distributed Sensor Networks"; ACM Transactions on Information and System Security, Feb. 2005, vol. 8, No. 1, pp. 41-77.

* cited by examiner

METHOD FOR DISTRIBUTING ENCRYPTION MEANS

FIELD OF THE INVENTION

The present invention relates to a method for distributing a keying material to a plurality of radio stations in a network in order to enable efficient key agreement and/or authentication and/or identification and/or authorization.

This invention is, for example, relevant for a wireless network comprising low power or low complexity radio nodes like a ZigBee network.

BACKGROUND OF THE INVENTION

Conventional Wireless sensor networks (WSNs) comprise wireless sensor and actuator nodes that wirelessly communicate with each other enabling different applications such as pervasive healthcare or smart lighting environments. For instance, a medical sensor network (MSN) is a wireless sensor network where patients are equipped with wireless medical sensors (WMSs) that measure, process and forward users' vital signs in real time. Clinical staff can monitor patient's vital signs by means of, e.g., PDAs or bedside monitors.

In this particular context, the provision of basic security services such as entity identification, authentication and access control to wireless sensor networks are essential. Indeed, such a network must be robust and secure enough to prevent attackers from gaining control over the network. General data protection policies such as the European directive 95/46 or healthcare rules such as HIPAA in the United States must be taken into account when designing security systems for MSNs. For instance, only authorized doctors should be able to monitor patient's vital signs.

To enable the network to be robust, the distribution of encryption keys is crucial. These encryption keys are used to establish an encrypted connection between two nodes, avoiding thus eavesdropping. Thus, key distribution among the nodes is the security's cornerstone as it defines how to distribute the cryptographic keys used to enable those security services. However, the efficient provision of both key distribution and security services is challenging due to the resource-constrained nature of wireless sensor nodes as WMSs in MSNs.

$\alpha$-secure key distribution schemes (KDSs) have been identified as a feasible option for key distribution and key agreement in wireless sensor networks such as medical sensor networks (MSN). These schemes offer a trade-off between scalability, resilience, connectivity, and computational overhead. In $\alpha$-secure KDSs, nodes do not share ready-made keys. Instead, nodes are provided with some node-specific information that allows them to compute a shared key with any other node in this security domain on input of that node's identifier. This node-specific information is derived from a keying material root ($KM^{Root}$) and the node-specific keying material share for node i is denoted by $KM^{(i)}$. Hence, the different keying material shares $KM^{(i)}$ are all different but correlated. This approach is especially interesting for mobile wireless sensor and actuator networks due to different reasons including: (i) its efficiency on resource-constrained wireless sensor nodes; (ii) its feasibility in mobile scenarios such as patient monitoring or wireless control networks addressed by the ZigBee Alliance where both scalability and distributed operation are key features.

Figure 1:
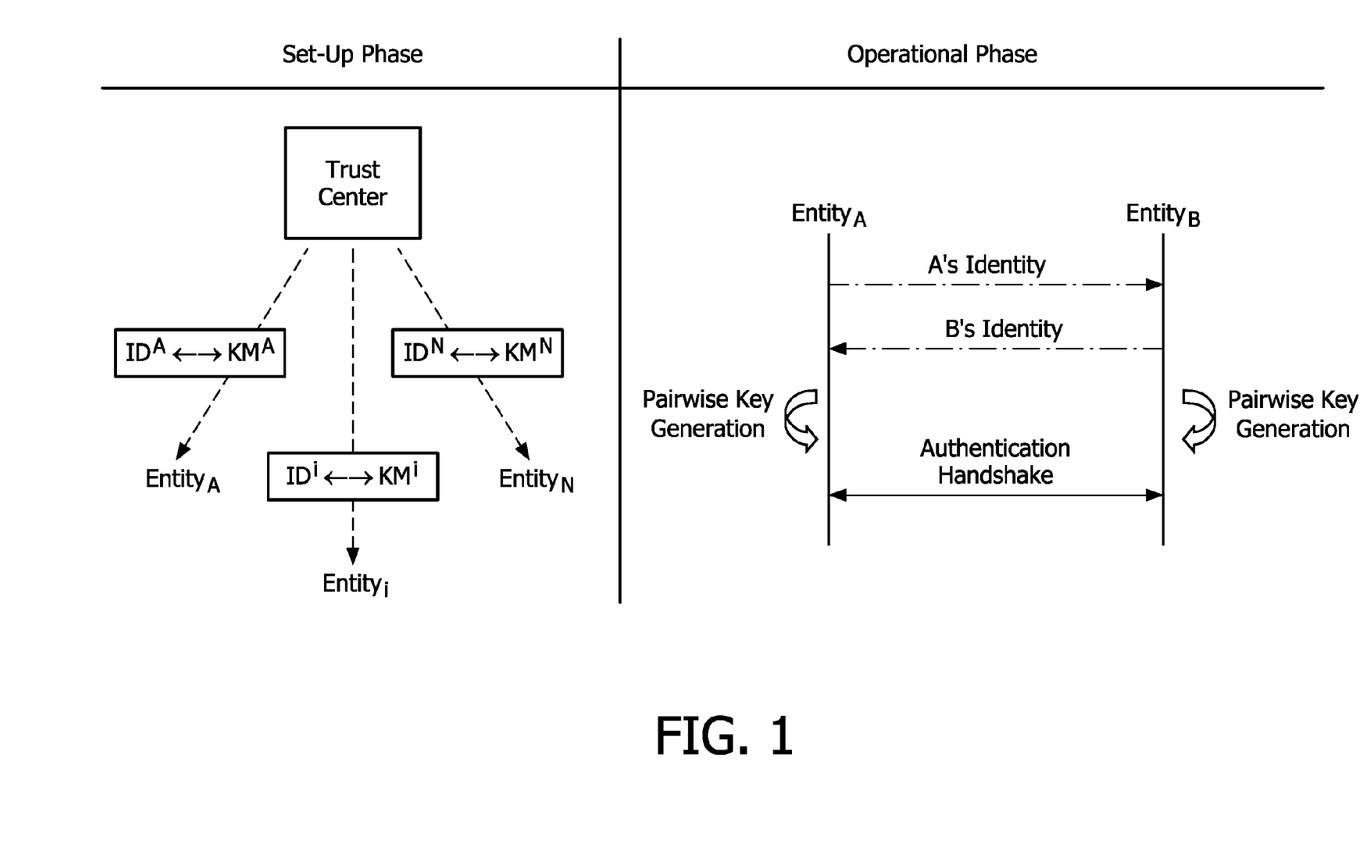
FIG. 1, already described, is a diagram illustrating a conventional method for distributing key material to radio stations of a network.

FIG. 1 depicts the main operation phases of an $\alpha$-secure KDS. During a first phase or set-up phase, a trust center (TC) generates a root keying material (KMroot). From KMroot, the TC generates a different (but correlated) keying material share, KM(i), for each and every node, i, in the security domain, with i=1, ..., N. Afterwards, the TC distributes a set of keying material share to each node. This distribution is carried out to increase the robustness of the system. In general, a node carrying a keying material share, KM(i), is identified by IDi. An $\alpha$-secure KDS can be created by using as KMroot a symmetric bivariate polynomial f(x,y) of degree $\alpha$ over a finite field Fq with q large enough to accommodate a cryptographic key. Given f(x,y), a TC can generate up to q different keying material shares by evaluating f(x,y) in different values of the x variable with $1 \le x \le q$, i.e., KM(i)=f(i,y) and ID(i)=i. Note that other $\alpha$-secure KDS can be used in order to minimize the computational requirements of the system.

In the second phase, the operational phase, any pair of arbitrary nodes in this security domain, A and B, can exploit their respective keying material shares to agree on a common key in a distributed fashion, i.e. without further TC involvement. To this end, both nodes obtain the identity of the peer by exchanging them, as part of a binding process or similar processes. Afterwards, they use their respective keying material shares in combination with the identities to generate a pairwise key.

For instance, we can assume again that a symmetric bivariate polynomial f(x,y) is used as root keying material, and nodes A and B carry the keying material shares f(A,y) and f(B,y) respectively. Firstly, both parties obtain their corresponding identities, i.e., B obtains A's identity IDA=A, and A obtains B's identity IDB=B. Then, each device can generate a common key in a distributed manner by evaluating its polynomial share in the identity of the other device, i.e., node A evaluates its polynomial share f(A,y) in y=B and node B evaluates f(B,y) in y=A. Therefore, both nodes agree on a common key K=f(A,B)=f(B,A). Finally, both nodes can use K to authenticate to each other by means of, e.g., a challenge-response authentication handshake, or derive a session key to enable confidentiality.

However, the evaluation of polynomials over a finite field $F_q$ with q large enough to accommodate a complete cryptographic key is computationally expensive on resource constrained devices (CPUs with small word size, e.g. 8-bit) as it requires the software implementation of modular multiplications with large operands.

SUMMARY OF THE INVENTION

It is an object of the invention to propose an improved method for distributing keying material solving these problems.

Another object of the invention is to propose a method for distributing keying material being robust and resource efficient when used for key agreement or the provision or further security services such as access control or identification Still another object of the invention is the provision of efficient combination of $\alpha$-secure KDS with other cryptographic methods in order to provide those security services.

To this end, the invention proposes a method for keying material distribution and distributed key agreement based on the use of some root keying material functions such as bivariate polynomials used to distribute some keying material function shares to devices according to the devices' identifiers. Root keying material functions, keying material function shares and identifiers are divided into multiple segments or sub-root keying material functions, sub-keying materials function shares or sub-identifiers allowing for more efficient computation and providing a higher security level.

According to another embodiment, the invention proposes a method for efficient combination of keying material functions and other cryptographic functions such as hash functions and Merkle trees by exploiting the higher security level and the multiple segments to ensure a minimum security level in the system when less than a number of entities are compromised.

The present invention also relates to a trust center

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for distributing a key material to a plurality of radio stations for enabling secure communications between the radio stations.

The present invention is more especially dedicated to a low power, low complexity radio network, as for instance a ZigBee network.

Figure 2:
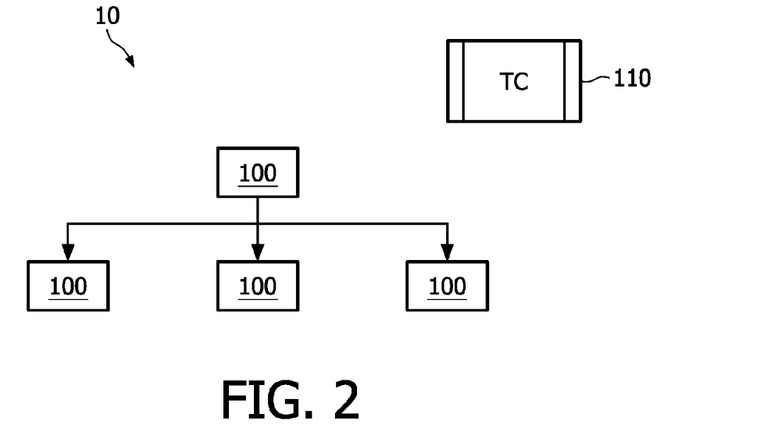
FIG. 2 is a block diagram of a network in which the method in accordance with a first embodiment of the invention.

As depicted on FIG. 2, a wireless network 10 comprises a plurality of radio stations 100 connected to each other by means of wireless connections in this example. However, it is to be noted that the invention could be implemented in a wired network. In the example of a low cost network, the radio stations 100 are resource constrained. For instance, a radio station 100 may be a PDA or mobile phone. In order to manage and authorize the radio stations to create secure connections, a Trust Center 110 is provided. This Trust Center is a particular device which is able to check whether a radio device requesting access to the network 10, and to provide to this new radio device with an identifier and encryption means.

As an example, the network uses an α-secure KDS, whose operation was illustrated in FIG. 1. During a first phase of initialization or set-up phase, the trust center 110 (TC) generates a root keying material ($KM^{root}$). From $KM^{root}$, the TC 110 generates a different (but correlated) keying material share, $KM^{(i)}$, for each and every node or radio station 100, i, in the security domain, with i=1, . . . , N. Afterwards, the TC 110 distributes a set of keying material share to each node 100. In general, a node 100 carrying a keying material share, KM(i), is identified by IDi. Typically, the $KM^{root}$ may be a symmetric bivariate polynomial f(x,y) of degree α over a finite field $F_q$ with q large enough to accommodate a cryptographic key. Given f(x,y), a TC 110 can generate up to q different keying material shares by evaluating f(x,y) in different values of the x variable with 1≤x≤q, i.e., KM(i)=f(i,y) and ID(i)=i. Note that other α-secure KDS can be used in order to minimize the computational requirements of the system.

In the second, operational phase, any pair of arbitrary nodes 100 in this security domain, A and B, can exploit the pre-distributed keying material shares to agree on a common key in a distributed fashion, i.e. without further TC involvement. To this end, both nodes 100 obtain the identity of the peer by exchanging them, as part of a binding process or the like. Afterwards, they use their respective keying material shares in combination with the identities to generate a pairwise key.

For instance, we can assume again that a symmetric bivariate polynomial f(x,y) is used as root keying material, and nodes A and B carry the keying material shares f(A,y) and f(B,y) respectively. Firstly, both parties obtain their corresponding identities, i.e., radio station B obtains A's identifier $ID_A$=A, and radio station A obtains B's identifier $ID_B$=B. Then, each radio station can generate a common key in a distributed manner by evaluating its polynomial share in the identity of the other radio station, i.e., node A evaluates its polynomial share f(A,y) in y=B and node B evaluates f(B,y) in y=A. Therefore, both nodes agree on a common key K=f(A,B)=f(B,A). Finally, both nodes can use K to authenticate to each other by means of, e.g., a challenge-response authentication handshake, or derive a session key to enable confidentiality.

α-secure lightweight digital certificates (α-sLDCs) may be used in combination with the previous system to enable authentication of a digital identity and role-based access control on resource-restricted devices. A lightweight digital certificate consists of a set of attributes associated with an entity. This set of attributes can include the entity's digital identity (name, profession, etc), access control roles, as well as other parameters. To efficiently verify and authenticate such a certificate they are combined with α-sKDS by setting the identifier of the KDS to the hash over all attributes in the certificate. If a node wants to verify the certificate of another node, they use the system described above to authenticate each other with the help of the key material distributed to them by the trust center. If the authenticated ID of the other node matches the hash of the attributes in the certificate, the certificate is valid and was issued by the trust center. To satisfy privacy requirements in certain applications, a Merkle tree can also be used to generate a privacy aware digital certificate. In this approach, each attribute is encoded in a different leaf of the tree. Therefore, every attribute can be disclosed independently of the other attributes However, the computational cost of evaluating a polynomial increases exponentially with the size of the key. Therefore, an approach must be defined in order to create a system that successfully combines α-sLDC with α-sKDSs on resource constrained devices such as sensor nodes.

In accordance with the invention, it is proposed to divide the hash output into t sub-IDs of i bits length with i={8,16}, following the Divide and Conquer technique i.e.:

Hash(Digital Identity)=ID=ID1∥ID2∥ . . . ∥IDt

Each of these t sub-IDs might be used then to evaluate the corresponding segment over $F_{q'}$. However, this Divide and Conquer approach is not as secure as the conventional method, since an attacker that compromised several nodes can "reuse" the acquired key material by combining segments from different nodes to create much more authenticated identifiers than should be possible with the number of nodes the attacker compromised. For instance, if an attacker captured two nodes with identifiers A=A1||A2 and B=B1||B2, she can also create (and authenticate) new identifiers such as X=A1||B2 and Y=B1||A2 by recombining the acquired sub-IDs for which she has valid key material and can therefore use them to forge other identities. Note that this makes finding collisions possible, i.e., forging certificates because now an attacker has an exponentially better probability to create a certificate for which she has valid key material.

In accordance with a first embodiment of the invention, this system is built on the Divide and Conquer technique to allow for efficient combination of α-sLDC and α-sKDSs. Furthermore, in order to improve the robustness of the distribution scheme, it is proposed to use a larger number of segments to allow providing a minimum security threshold even though several nodes are captured. The following steps may be performed in accordance with a first embodiment of the invention:

An identifier (ID) is generated from the digital identity of an entity by hashing it, or using a Merkle tree. ID has a length of i·t bits, where i is i=$\log_2(q')$, i.e., the coefficient, sub-key size, and sub-identifier size of a segment, and t is the number of segments used. In general and in difference to α-secure KDS without digital certificates i·t is larger than the minimum security level that the system must provide.

The system makes use of an α-secure KDS based on polynomials and key segmentation techniques. The α-secure KDS is the engine used:

(i) by the trust center to compute α-secure KM for a node from the $KM^{root}$.

(ii) by the nodes to compute pairwise keys as the concatenation of t sub-keys of i bits. Each sub-key is generated from a segment over a finite field $F_{q'}$ with q'>2i. Each segment j=1, . . . , t is evaluated in the corresponding sub-identifier IDj with j=1, . . . , t.

The system hashes the resulting key of i·t bits, which comprises t different sub-keys, in order to obtain a new key of x bits where x is the desired key size. This ensures that the key fits the requirements of underlying security algorithms. For instance, a key of 128 bits used in the advance encryption standard (AES). This has for advantage that it randomizes the used key preventing attackers from launching special attacks against underlying attacks due to the knowledge of a specific part of the key.

In general, this system has the following two properties:

The system is α-secure, i.e., the capture of more than a nodes allows an attacker to crack the system.

A key, for instance a lightweight digital certificate, generated from an α-secure KDS using a key of i·t bits (sub-key of i bits, and t sub-keys) provides a security of x bit when less than n nodes are compromised, where $$n = 2^{\frac{i \cdot t - x}{t}}$$

Security Analysis—Digital Certificates

This section briefly presents the security proof of our system targeting the efficient combination of lightweight digital certificates based on α-secure KDS.

Lightweight digital certificates used in combination with α-secure KDS based on polynomials and key segmentation techniques provide a security of at least x bit when less than Nc nodes are compromised, where $$N_C = 2^{\frac{i \cdot t - x}{t}}$$

Proof—Given an α-secure KDS based on polynomials and key segmentation techniques where a key is computed as the concatenation of t sub-keys of i bits, n is the number of compromised nodes, and x the security level to be achieved, we know that:

The number of digital identities that an attacker can forge after capturing Nc nodes is (Nc)t The key space of b bit keys is 2b.

Therefore, to achieve a security of x bits we have to ensure that:

$$2^x < \frac{2^{i \cdot t}}{n^t} \Leftrightarrow 2^x n^t < 2^{i \cdot t} \Leftrightarrow x + t \log_2 n < i \cdot t \Leftrightarrow \log_2 n < \frac{i \cdot t - x}{t} \Leftrightarrow n < 2^{\frac{i \cdot t - x}{t}}$$

Figure 3:
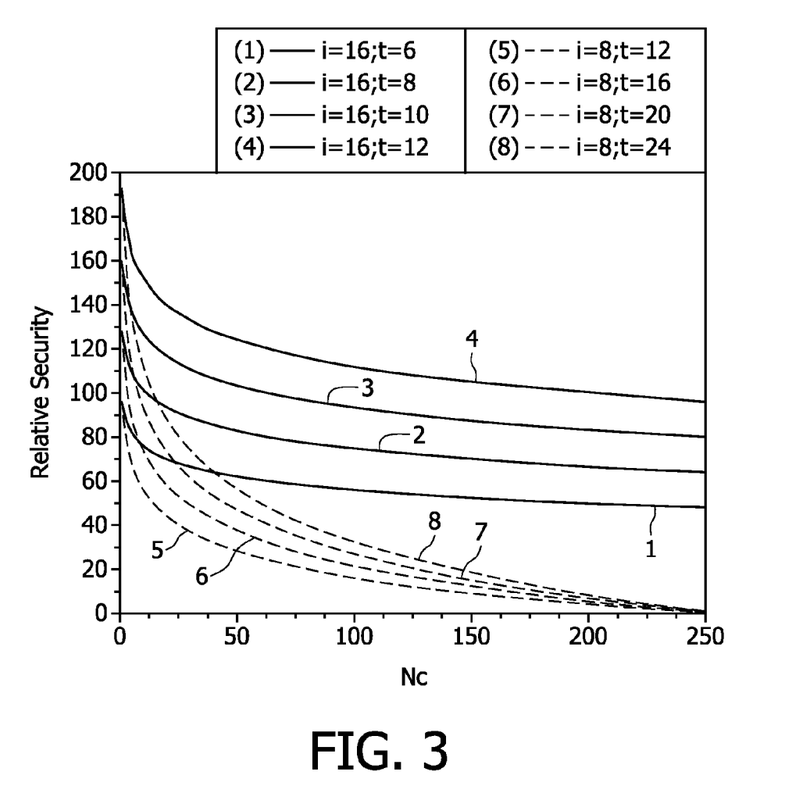
FIG. 3 is a graph representing the relative security of the system as a function of the number of compromised nodes.

FIG. 3 represents the relative security of the system as a function of the number of compromised nodes. The relative security of the system is depicted for different combinations of i and t. In general, if i=8, the system does not provide a sufficiently high security level. However, for i=16 the system can provide a reasonable security level even after compromising a relatively high amount of nodes.

Security Impact on α-Secure KDS

The technique described in section 2 allows creating a very efficient system combining lightweight digital certificates with α-secure KDS such as a single polynomial or the DPKPS. In the first case, the approach does not have any effect on the security of the α-secure polynomial. However, if the DPKPS is used as α-secure KDS the system's resiliency behaves in a slightly different way. Next, we expound this.

Figure 4:
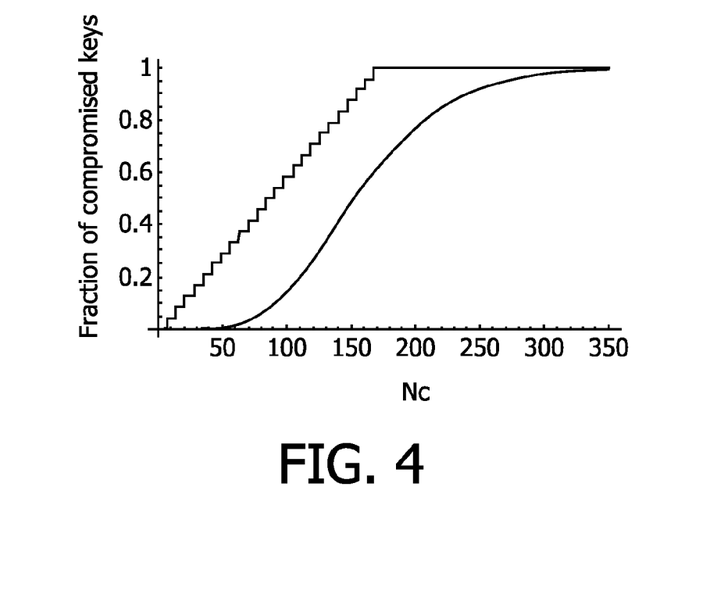
FIG. 4 is a graph showing the resilience against smart attacker and a naive attacker for a key distribution scheme.

The DPKPS is a polynomial-based α-secure KDS that intends to keep constant the system resiliency (α) while speeding up the key computation. To this end, the DPKPS distributes to each node n+1 polynomials of degree λ instead of a single polynomial of degree α=(λ+1)(n+1) (here a polynomial means a set of t polynomials over a finite field Fq'). The DPKPS is designed in such a way that any pair of nodes shares a single polynomial out of the n+1 available to every node. The pairwise key is generated from this common polynomial, and thus, the computational requirements are reduced by a factor of n+1. The main drawback is the resiliency behaviour of the system. Having a single polynomial of degree α is secure as long as less than a nodes are captured. However, this is different for the DPKPS as an attacker can capture a lesser number of nodes and in spite of this fact crack some of the smaller polynomials of degree λ. This is depicted in FIG. 4 for a specific DPKPS configuration setting, where the resilience curve in red is the resilience against a smart attacker and the curve in blue is the resilience against a naïve attacker or a random attack.

To understand this we have to pay attention to the fact that in the original DPKPS each node has a single 16 bit identifier from which we can derive the polynomials (each composed by t sub-polynomials over $F_{q'}$) a node carries as well as the points where they were evaluated. Therefore, by capturing λ+1 nodes carrying the same polynomial an attacker can eavesdrop on all the communications based on this polynomial.

Figure 5:
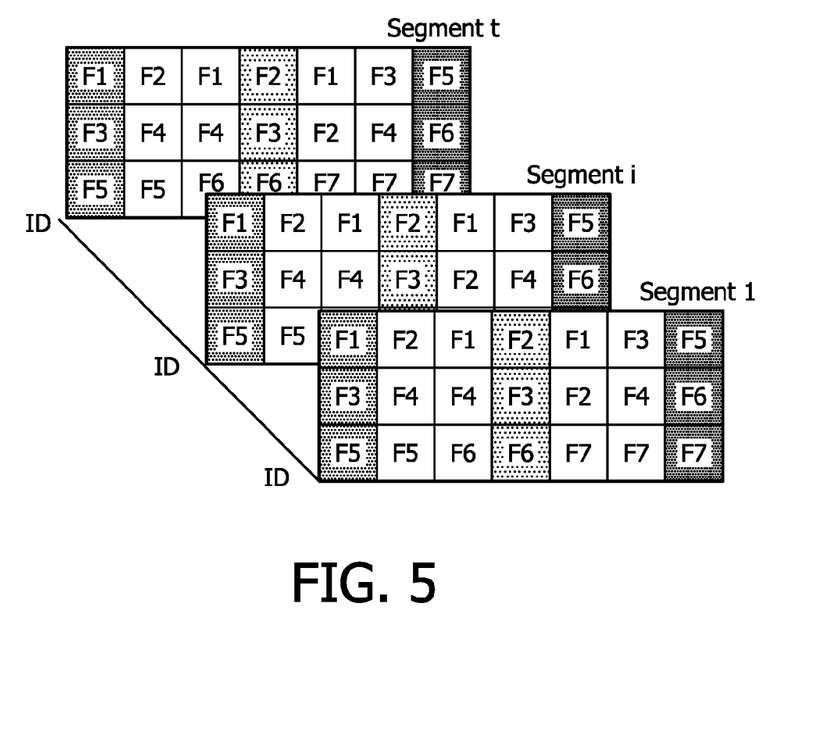
FIG. 5 is a diagram representing the distribution of polynomial functions over radio stations in accordance with a conventional method.

This setting is depicted in FIG. 5. We represent the DPKPS keying material carried by three nodes (green, blue, and red). Each node has three polynomials (n+1=3) composed of t different segments of sub-polynomials. In this situation, if node green needs to communicate with node blue, they do it by using the common polynomial F3. As the ID is constant for all the segments, they use the same subpolynomial F3 for all the segments. Therefore, if an attacker captures λ+1 nodes carrying F3, the attacker will be able to eavesdrop on the communication between the green and blue node.

Figure 6:
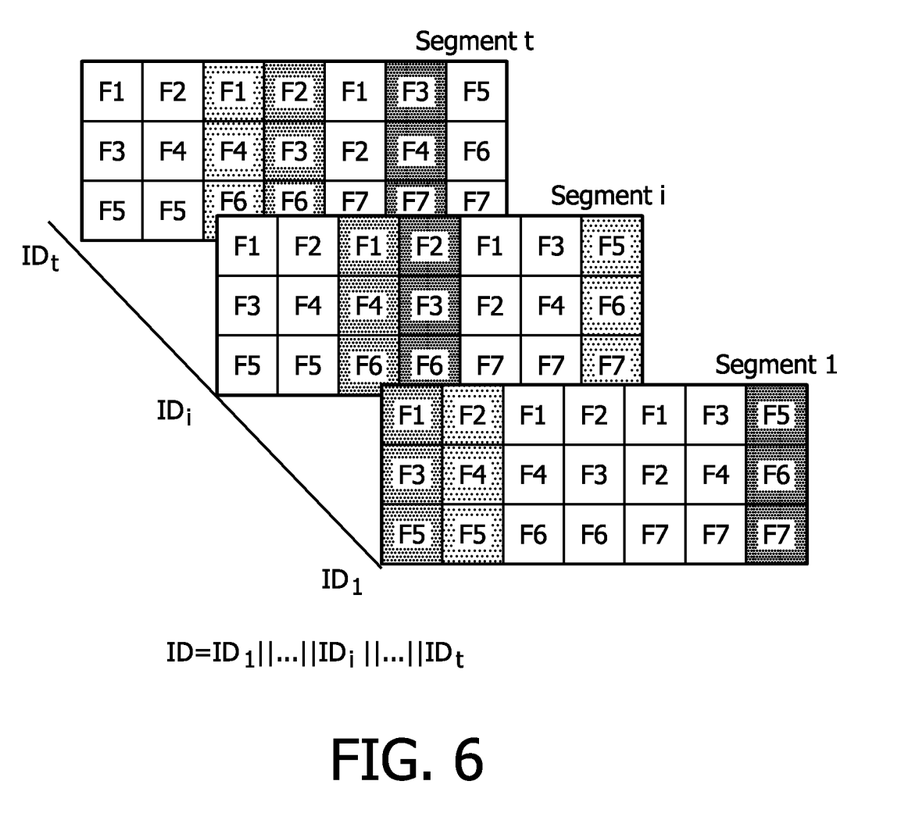
FIG. 6 is a diagram representing the distribution of polynomial functions over radio stations in accordance with the invention.

The use of the approach in accordance with this invention improves this as each segment k, with 1≤k≤t, uses a different identifier $ID_k$. Therefore, the sub-polynomials assigned to a node for a specific segment depend on the corresponding sub-identifier. FIG. 6 represents this situation.

Figure 7:
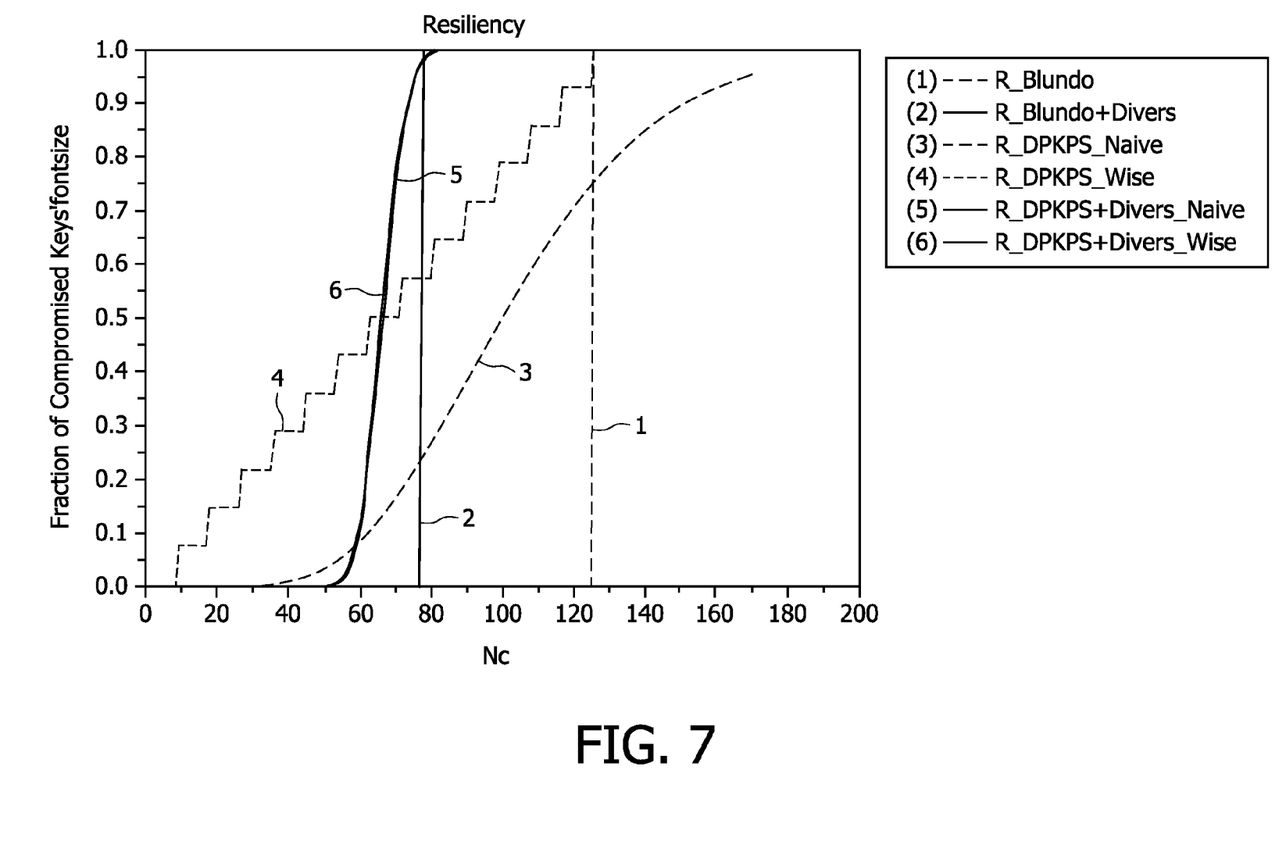
FIG. 7 is graph representing the resiliency behaviour for the DPKPS with and without segment diversification.

This has a high impact on the resiliency of the system due to the fact that two nodes have different common sub-polynomials in different segments making harder to crack the system. It may not be useful to use a deterministic diversification method that achieves the same goal, while the system here described is a matter of random segment diversification, i.e., segments are distributed in a random like fashion. This is easy to understand as the IDs are generated by means of a hash function whose output might look random. FIG. 7 depicts the resiliency behaviour for the DPKPS with and without segment diversification for a fixed size of the key material. In this figure the reader can assess the improvement on the system security with respect to the normal DPKPS when just a few entities have been compromised.

It is worth noting that a wise attacker, i.e. an attacker that can choose which node she compromises next, has now virtually no advantage over a naïve attacker, i.e. an attacker that compromises random nodes. This is because nodes possess random sub-IDs due to the output of the hash function that was used to create the identifiers for the nodes.

The techniques described in this invention can find application in very different application areas including:

Security systems for wireless sensor networks based on α-secure key distribution schemes, specially for:

Applications such as Medical sensor networks used for pervasive patient monitoring, Smart environments, such as distributed lighting/building automation/building management systems, where access control policies must be observed.

Wireless sensor networks based on IEEE 802.15.4/ZigBee were α-secure key distribution schemes are being standardised and access control solutions are required.

Efficient realization of systems based on lightweight digital certificates on resource-constrained devices such as sensor nodes or personal digital assistants.

While the invention has been illustrated and described in detail in the drawings and foregoing description, such illustration and description are to be considered illustrative or exemplary and not restrictive; the invention is not limited to the disclosed embodiments.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

The invention claimed is:

1. A method of communicating from a first radio station to a second radio station, comprising:
    at the first and second radio stations, receiving respectively a first and second identifiers and first and second keying materials, distributed from a trust centre in accordance with the following steps:
    dividing a hash output of a first identifier of the first radio station at the trust centre, said first identifier being a code word consisting of a first number of bits,
    generating for each sub-identifier at the trust centre, a keying material function selected out of a first set of keying material functions on the basis of the considered sub-identifier, and
    transmitting from the trust centre to the first radio station the first identifier and the first set of keying material comprising a set of generated encryption functions,
    dividing a second identifier of the second radio station at the trust centre, said second identifier being a code word consisting of a first number of bits, into a plurality of sub-identifiers,
    generating for each sub-identifier at the trust centre, a keying material function selected out of a second set of keying material functions on the basis of the considered sub-identifier, and
    transmitting from the trust centre to the second radio station the second identifier and the second set of keying material comprising the generated encryption functions,
    at the first radio station transmitting the first identifier to the second radio station,
    at the second radio station computing a second encryption key based on the second keying material and the first identifier, and
    sending a first message to the first station by means of the second encryption key,
    at the first radio station, checking whether the first message is valid before starting the communication with the second radio station,
    wherein the second encryption key is obtained by
        (a) generating a set of subkeys by means of the set of keying material functions of the second key material applied over the first identifier,
        (b) obtaining the second encryption key from the concatenation of the subkeys.

2. The method of claim 1, wherein the first and second identifiers are based on at least one identity parameter of the radio station.

3. The method of claim 1, wherein the length of the codeword is sufficient to provide a requisite level of security mandated by the trust centre.

4. The method of claim 1, wherein the keying material functions selected out of the first and second set of keying material functions are polynomial functions.

5. The method of claim 1, further comprising the steps of at the second radio station transmitting the second identifier to the first radio station, at the first radio station computing a first encryption key based on the first key material and the second identifier, and sending a first message to the second radio station by means of the first encryption key,
    at the second radio station, checking whether the second message is valid before starting the communication with the first radio station.

6. The method of claim 1, wherein step (b) of claim 1, further comprises applying a hash function on the concatenated subkeys to obtain the second encryption key.

7. The method of claim 1, wherein the keying material functions are combined with other cryptographic functions.

8. The method of claim 7, wherein the cryptographic function is a hash function or a Merkle tree.

* * * * *